United States Patent [19]

Quirk

[11] 4,017,568
[45] Apr. 12, 1977

[54] TECHNIQUE FOR COMPRESSION SEALING ELECTRICAL CONDUCTORS IN A RIGHT CIRCULAR CYLINDER RESIN CASTING

[75] Inventor: James F. Quirk, Pittsburgh, Pa.
[73] Assignee: Westinghouse Electric Corporation, Pittsburgh, Pa.
[22] Filed: May 20, 1974
[21] Appl. No.: 471,738
[52] U.S. Cl. .................................. 264/27; 174/151; 264/272
[51] Int. Cl.² ..................... B29D 3/00; B29G 7/00; H01B 17/26
[58] Field of Search ........... 174/151, 152 R, 153 R; 264/27, 271, 272

[56] References Cited
UNITED STATES PATENTS

| | | | |
|---|---|---|---|
| 1,914,551 | 6/1933 | Ainsworth | 264/27 |
| 2,697,855 | 12/1954 | Brown | 264/27 |
| 2,978,532 | 4/1961 | Burnett et al. | 174/151 X |
| 3,433,893 | 3/1969 | Hofmann et al. | 174/153 R |

*Primary Examiner*—Laramie E. Askin
*Attorney, Agent, or Firm*—M. P. Lynch

[57] ABSTRACT

By controlling the surface-to-volume ratio of a right circular cylinder resin casting and the heat sink characteristics of penetration elements, i.e., metal conductors, within the casting, the exotherm forces developed during curing of the resin casting can be controlled so as to consistently produce a highly reliable compressive seal between the resin composition and the penetration elements without the need for bonding agents.

2 Claims, 4 Drawing Figures

TECHNIQUE FOR COMPRESSION SEALING ELECTRICAL CONDUCTORS IN A RIGHT CIRCULAR CYLINDER RESIN CASTING

BACKGROUND OF THE INVENTION

There are ever increasing demands for electrical penetration assemblies which can be reliably mounted to provide electrical access from one area into a second area wherein atmospheric gas isolation between the respective areas is essential. A specific application for such assemblies exists in a nuclear field wherein the requirements exist for transmitting the electrical signals from a radiation environment through a containment wall to a control room for monitoring and recording. In this application there are very stringent requirements placed on the electrical penetration assemblies so as to minimize the possibility of radiation leaking into the environment occupied by personnel operating the facility.

Traditional penetration assemblies have been constructed through the use of adhesive coating applied to carefully treated metal penetration elements for sealing within resin castings typically consisting of epoxy and plastic compositions. These traditional techniques have not met the stringent leak rate specifications imposed on facilities housing nuclear reactors.

SUMMARY OF THE INVENTION

The invention described herein with reference to the accompanying drawings is a technique for designing the geometry of a resin casting having an effective right circular cylinder volume and controlling thermal conductivity characteristics of penetration elements to control the exotherm forces developed during curing so as to consistently provide a compressive seal between the resin composition and the penetration elements. The geometry of the resin casting is controlled on the basis of a shape factor which corresponds to the ratio of the total surface area to the total volume of the casting so as to assure that the exotherm core produced during the curing of the resin casting collapses in an inward direction to produce tangential and compressive forces against penetration elements inserted within the exortherm core area to achieve the desired compressive seal. Numerous testing and evaluation of various geometric shapes has resulted in the determination that shape factors of between approximately 1.0 inches$^{-1}$ and 2.0 inches consistently provide highly reliable compressive seals without the requirement for adhesive coatings or special treatment of the penetration elements.

The failure of the prior art techniques to realize and utilize the exotherm forces developed during curing of the resin casting is apparent from the failure of the prior art to appreciate the significance of the surface-to-volume ratio of the resin casting.

An exotherm core consisting of a self heating fluid resin composition is developed at the geometric center of a right circular cylinder resin casting during the curing or thermosetting process of the resin casting within a heated environment. Self heating results from the fact that the core is at sufficient distance from all exterior surfaces of the casting that the fluid at the center of the casting comprising the core does not lose heat to the exterior surface. The hot resin composition comprising the exortherm core will tend to collapse toward its center during curing or solidify.

The exortherm core, which is located approximately at the geometric center of the resin casting, is of a shape approximating the shape of the resin casting. A right circular cylindrical resin casting having a shape factor between 0.9 inches$^{-1}$ and 2.0 inches$^{-1}$ will produce a right circular cylindrically shaped exortherm core.

Inasmuch as the curing of the right circular cylinder resin casting takes place within a heated environment, i.e., a furnace, if the surface-to-volume ratio of the resin casting is such as to minimize the distance between the center of the casting and the surfaces of the resin casting, no substantial exortherm core will exist and the resin composition will shrink away from the center of the casting and toward the heat source represented by the external surfaces of the resin casting. It has been determined experimentally that if the shape factor of the resin casting is controlled so as to establish sufficient distance between the geometric center and the external surfaces of the resin casting, an exotherm core is produced which is itself a heat source sufficient to cause an inward collapse of the exotherm core fluid during curing. Having achieved a shape factor producing such an inward collapse, the positioning of penetration elements, i.e., metal conductors, within the exotherm core will produce a compressive seal between the resin composition and the surfaces of the penetration elements as a result of the inward collapse of the exotherm core and its solidification in that collapsed state. This inward collapse produces tangential forces against the penetration element which have been measured to be as high as 16,000 psi. If the mass and thermal conductivity characteristics of the penetration element or elements positioned within the exotherm core are sufficient to represent a heat sink, or cold surface, so as to reduce the heat source and compressive collapse characteristics of the exotherm core during curing, the penetration elements are heated to a temperature sufficient to eliminate the heat sink effect and thus assure the compressive collapse of the resin composition against the penetration elements. The heating of the penetration elements effectively makes the penetration elements appear to be thermally similar to the exortherm core of the resin composition. The selection of materials for the penetration elements will in part determine whether additional heat input is required to produce the exotherm core. For instance, the thermal conductivity characteristics of copper are approximately twice that of aluminum. Thus an assembly comprised of aluminum penetration elements would represent less of a heat sink than as assembly comprised of copper penetration elements.

This technique for consistently providing a highly reliable compression seal between a resin composition and a penetration element applies to both solid and tubular penetration elements. In the case of a tubular penetration element, the wall thickness of the tubular member must be sufficient to withstand the compressive forces produced by the collapse of the resin composition during curing.

DESCRIPTION OF THE DRAWINGS

The invention will become more readily apparent from the following exemplary description in connection with the accompanying drawings.

DESCRIPTION OF THE PREFERRED EMBODIMENT

Figure 1:
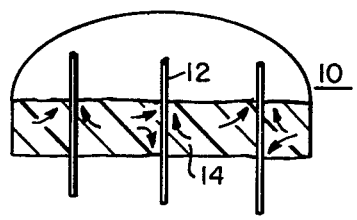
FIG. 1 is a sectioned schematic illustration of a resin penetration assembly which violates the compression seal teachings of the invention.

Referring to FIG. 1 there is illustrated a resin casting 10 of an exaggerated pancake geometry having penetration elements 12 positioned therein. The resin casting configuration of FIG. 1 is illustrated to show a geometry totally violating the shape factor consideration necessary to develop an exotherm core to produce a compression seal between the resin composition 14 and the penetration elements 12. In the configuration of FIG. 1, the distance from the center of the resin casting to the exterior surface which is exposed to the curing temperature environment is so small that no exotherm core is produced and the curing forces occur in a random direction (as indicated by the arrows) toward the heated surfaces of the resin castings. It is apparent from FIG. 1 that the random pattern of forces developed during curing cannot be utilized to develop a compression seal between the resin composition and the penetration elements 12.

Figure 2:
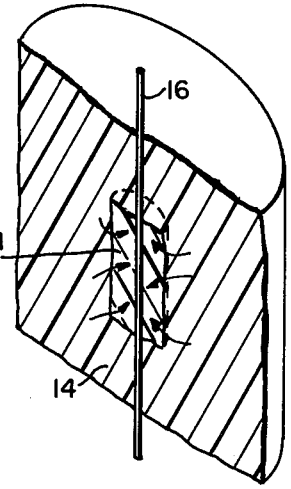
FIG. 2 is a sectional illustration of a right circular cylinder resin casting containing a single penetrating element in accordance with the novel compression seal technique.

The curing forces represented by arrows represents an outward collapse or shrinkage of the resin composition toward the heated exterior surfaces of the casting and away from contacting relationship with the penetration elements. This produces an undesirable leak path between the penetration elements 12 and the resin composition 14. It was determined experimentally, however, that if the surface-to volume ratio of the resin casting were controlled such that the central portion of the casting is at a distance sufficient from the exterior surface of the resin casting, an exotherm core would develop and produce forces in such a direction to cause the resin mass to collapse inwardly during the curing process. This condition is illustrated in the resin casting configuration of FIG. 2. A resin composition which has proven particularly successful in nuclear environments and which exhibits exotherm characteristics is represented by the following resin mixture.

| Materials | Parts by Weight |
|---|---|
| EPON Resin 815 | 100.0 |
| Ground silica filler | 280.0 |
| Curing Agent Z | 20.0 | where EPON Resin 815 and Curing Agent Z are products of the Shell Oil Co.

In a typical curing situation, the temperature at the central or exotherm core area X of the resin casting would be typically 150° C while the temperature of the external surface of the resin casting would be typically 90° C. Assuming the mass of a single penetration element 16 to be minimal, thus not representing a heat sink, it has been determined experimentally, that a shape factor defined as the ratio of the total surface are to total volume of the resin casting of not greater than 2 inches$^{-1}$ will provide a highly reliable seal between resin composition and penetration elements in right circular cylindrical resin castings. The shape factor for a right circular cylinder cylindrical resin casting is defined as:

$$\text{Shape Factor (cylinder)} = \frac{\text{Total Surface Area}}{\text{Total Volume}} = \frac{\pi dh + 2\pi r^2}{\pi r^2 h} = \frac{dh + 2r^2}{r^2 h}$$

where $h$ is the height of the casting in inches, $r$ is the radius and $d$ is the diameter in inches.

Figure 3:
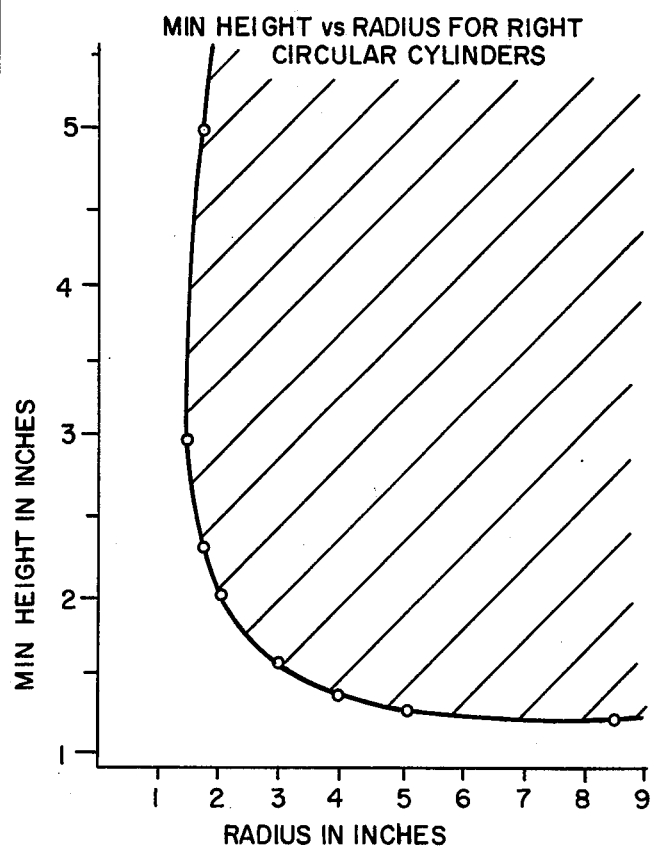
FIG. 3 is a graphical illustration of the inventive concept for providing compression sealing of penetration elements in right circular cylinders as illustrated in FIG. 2.

This relationship has produced the design information illustrated graphically in FIG. 3. It was determined experimentally that as the shape factor of the resin casting increased above 2 inches$^{-1}$, the quality and reliability of the compression seal is diminished. Referring to FIG. 3 there is plotted the minimum height in inches versus radii conditions in inches for achieving a shape factor of 2 inches$^{-1}$, which approximates the highest shape factor for producing consistently reliable high quality compression seals. Any combination of radius and height falling within the cross-hatched area of FIG. 3 will produce a shape factor of less than 2 inches$^{-1}$ and thus represent design parameters which will achieve the desired compression sealing between the resin composition and the penetration elements. While shape factors of between 0.9 inches$^{-1}$ and 2.0 inches$^{-1}$ have proven to provide suitable compression sealing between the resin composition and the penetration elements, optimum compression sealing with compression forces of up to 16,000 psi are realized with shape factors in a range of about 0.9 inches$^{-1}$ to 1.77 inches$^{-1}$. Shape factors of less than 0.9 inches$^{-1}$ become impractical due to the large charges in surface area or volume of the casting which would be required.

Discussion heretofore has been based on a right circular cylinder resin casting wherein a single penetration element of negligible mass is compressively sealed within a resin composition as a result of the compressive forces developed during the inward collapse of the exotherm core of the resin casting. Typically, however, penetration assemblies consist of a plurality of penetration elements in the form of metal conductors sealed within the resin composition. If the mass represented by a single large penetration element or a plurality of penetration elements is such as to constitute a heat sink, thus destroying the compression collapse of the resin composition about the penetration elements, the penetration elements are heated to a temperature suitable to maintain the temperature of the exotherm core to assure compressive collapse of the resin composition about the surface of the penetration elements.

Figure 4:
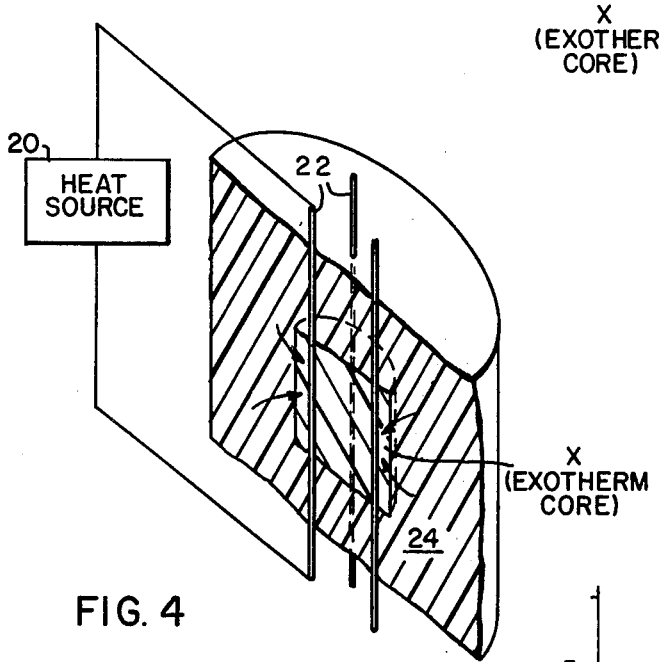
FIG. 4 is an isometric illustration of a modification to the embodiment of FIG. 2 to compressively seal a plurality of penetration elements within the resin casting.

This situation is illustrated in FIG. 4. Heat source 20 supplies heat to the penetration elements 22 of the casting 24 so as to make the penetration elements appear to be thermally identical to the resin composition of the exotherm core X. The temperature to which the penetration elements 22 are heated must be maintained below the temperature which would cause boiling of the resin composition which contacts the surface of the penetration elements. Boiling of the resin composition at the interface of the resin and the penetration elements could produce gas bubbles which will seriously diminsh the quality of the seal between the resin composition and the penetration elements.

What I claim is:

1. A method for consistently producing a gas-tight compression seal between the resin composition of a right circular cylinder resin casting and one or more electrical conductors extending through the end walls of the right circular cylinder resin casting without the use of bonding agents, comprising the steps of, positioning one or more electrical conductors within a mold designed to form a right circular cylinder resin casting having a surface-to-volume ratio in a range between approximately 0.9 inches$^{-1}$ and 2.0 inches$^{-1}$, locating the said one or more electrical conductors within a volume of said mold corresponding to the exotherm core of a resin composition to be introduced into said mold, casting a resin composition of a type to develop an exotherm core of approximately 150° C in said mold and produce a right circular cylinder resin casting having a surface-to-volume ratio in a range of between approximately 0.9 inches$^{-1}$ and 2.0 inches$^{-1}$, curing said resin composition, and heating said one or more electrical conductors, as required, to a temperature approximating the temperature of said exotherm core of said resin composition to assure the collapse of the resin composition of said exotherm core about said one or more electrical conductors during curing to produce a compression seal between said resin composition and said one or more electrical conductors.

2. A method as claimed in claim 1 wherein said heating is such as to maintain the resin composition comprising said exotherm core at a temperature of approximately 150° C during curing.

* * * * *